United States Patent [19]

Westerman, Jr. et al.

[11] Patent Number: 5,271,145
[45] Date of Patent: Dec. 21, 1993

[54] ROPE SAW CUTTING APPARATUS AND METHOD FOR SCARFING COMPOSITES

[75] Inventors: Everett A. Westerman, Jr., Auburn; Philip E. Roll, Kent, both of Wash.

[73] Assignee: The Boeing Company, Seattle, Wash.

[21] Appl. No.: 710,053

[22] Filed: Jun. 3, 1991

[51] Int. Cl.$^5$ .................. B26D 1/547; B26D 1/153
[52] U.S. Cl. .................. 29/558; 29/402.11; 30/372; 83/651.1; 83/745; 408/94
[58] Field of Search ........... 29/402.11, 402.12, 402.13, 29/557, 558; 83/651.1, 745; 30/372; 144/35 R, 93 R, 365, 367; 408/93, 94

[56] References Cited

U.S. PATENT DOCUMENTS

| | | | |
|---|---|---|---|
| 1,017,207 | 2/1912 | Eggers | 125/21 |
| 1,703,890 | 3/1929 | Loetscher | 156/98 |
| 2,583,396 | 1/1952 | Skoog | 52/514 |
| 2,793,478 | 5/1957 | Rohowetz | 51/407 |
| 2,803,239 | 8/1957 | D'Avaucourt | 125/21 |
| 3,055,251 | 9/1962 | Krikorian | 83/651.1 X |
| 3,093,021 | 6/1963 | Barron | 125/21 |
| 4,016,856 | 4/1977 | McLaughlin | 125/21 |
| 4,517,038 | 5/1985 | Miller | 29/402.11 X |
| 4,603,678 | 8/1986 | Fish | 125/21 |
| 4,633,848 | 1/1987 | Bresciani | 125/21 |
| 4,753,188 | 4/1988 | Kubo | 116/217 |
| 4,936,284 | 6/1990 | Johnson | 83/651.1 X |
| 5,023,987 | 6/1991 | Wuepper et al. | 29/402.11 |
| 5,034,254 | 7/1991 | Cologna et al. | 29/402.12 X |

*Primary Examiner*—Mark Rosenbaum
*Assistant Examiner*—S. Thomas Hughes
*Attorney, Agent, or Firm*—Seed and Berry

[57] ABSTRACT

A rope saw cutting apparatus is partially insertable through a bore in a composite panel to scarf the panel without access to the blind side of the panel. The same apparatus can also be used to prepare a tapered repair plug to close tolerance to repair the scarfed panel. The apparatus preferably uses a rope saw blade to perform a plunge cut followed by a circumferential cut which has a desired taper or scarf angle.

26 Claims, 3 Drawing Sheets

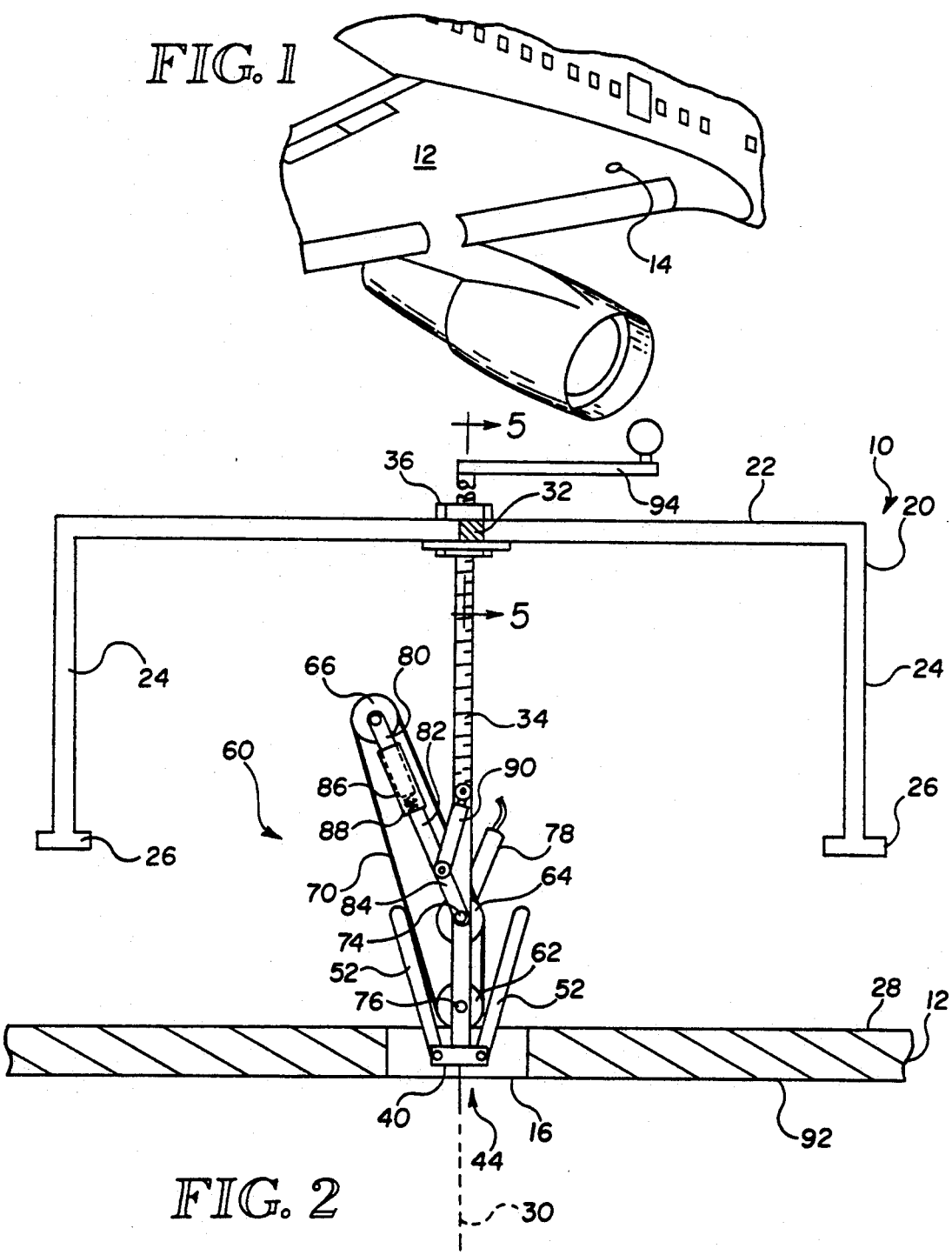

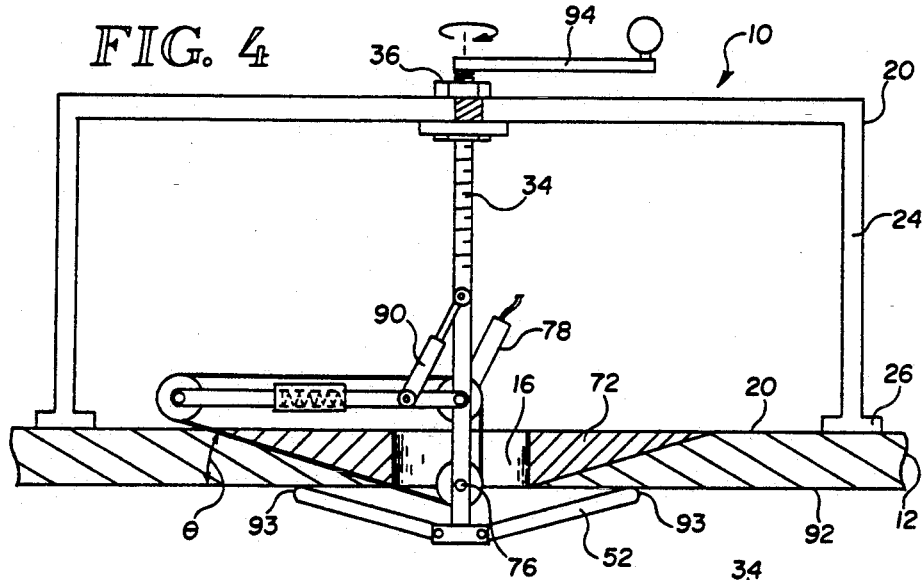
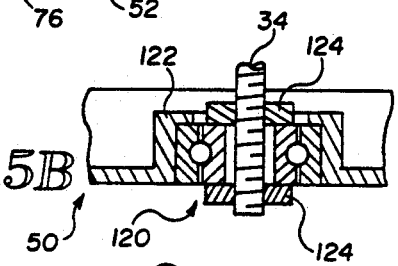

ROPE SAW CUTTING APPARATUS AND METHOD FOR SCARFING COMPOSITES

TECHNICAL FIELD

The invention relates to methods and apparatus for prepairing composite panels for repair. More specifically, the invention relates to preparation methods and apparatus for repairing composite panels.

BACKGROUND OF THE INVENTION

Reinforced composite materials are increasingly used as structural elements in modern aircraft. In particular, panels of composite material are now available for use as external surfaces on aircraft such as wing surfaces and fuselage surfaces. These panels can be manufactured in large sizes and then bonded to underlying composite or non-composite support structures such as stringers, spars, ribs, runners, etc. A typical composite panel includes a plurality of layers of woven cloth having a high tensile strength, such as a cloth made from carbon fibers with intervening layers of a resinous material, such as epoxy. The entire laminate is then cured under elevated temperature and pressure to form a consolidated composite structure. This consolidated structure can be engineered with anisotropic load-bearing properties by varying the number and direction of the fibers, if desired, and is thus highly desirable for high-strength, low-weight applications in aircraft.

Composites of this type are subject to damage, such as ballistic damage, when used on military aircraft. Repairing composite panels is difficult, particularly in the field, because of the nature of composites. Specifically, a composite panel which has been damaged is preferably repaired in such a manner to ensure that the repaired surface is flush with the surrounding, undamaged area of the panel, and to maintain the anisotropic load-bearing properties of the surrounding panel. Such repairs are further complicated by the fact that the panel may form part of a closed surface such as a portion of a wing, in which the interior surface or "blind side" of the panel is inaccessible. Further yet, the repair of such panels generally requires that the damaged area be trimmed so that the resulting aperture and patch have complimentary chamfered or tapered edges between an angle of 1°-5°. Such angle is typically referred to as "scarf angle" or taper angle.

Presently, blind side repairs of composite panels entail the use of grinding or milling steps. Dust and grit may adversely affect bonding of the patch to the trimmed area. Grinding or milling is labor intensive, and often fails to produce a smooth taper or scarf at the desired angle. For example, on a typical composite panel having a thickness on the order of approximately ⅛", the damaged area is milled away using a conventional milling apparatus by milling out concentric steps of increasingly reduced diameter towards one side of the damaged panel. The milling step is typically preceded by a gross grinding step which generally removes the damaged area from the panel. The milling procedure results in a step-like series of concentric rings of reduced diameter. Corresponding steps are then milled into a repair plug for mating with the milled area in the damaged panel. The resulting junction between the repair plug and the composite panel macroscopically resembles a smooth taper, but does not achieve the optimal gradual taper which is preferred for a proper scarf between the repair plug and the panel.

Various apparatus are available for cutting holes in panels. U.S. Pat. No. 2,793,478, to Rohowetz, and U.S. Pat. No. 4,603,678, to Fish, disclose band saw type devices which are capable of performing circular cuts and plunge cuts, respectively, but neither device is capable of trimming a damaged area of a panel without cutting through the perimeter of the panel. Such breaching of the panel perimeter is undesirable for panel repairs. Grinding apparatus such as the device disclosed in U.S. Pat. No. 2,583,396, to Skoog, would produce undesirable dust and grit as described above.

In view of the above, a need exists for a blind side method for trimming out a damaged area of a substantially closed surface without obtaining access to the "blind side" of the surface.

In addition, a need exists for a method for preparing a plug for a prepared damaged area of a composite panel having the desired scarf angle thereon.

SUMMARY OF THE INVENTION

The present invention provides a method and apparatus for trimming out a damaged area of a composite panel so that the trimmed out area has the desired scarf angle without access to the "blind side" of the panel.

The invention provides a rope or band saw apparatus and a folding mechanism for pivoting the blade in a plane. The apparatus is capable of performing a plunge cut in a panel to be repaired followed by a circular cut generating a smooth, conical bore in the panel and around the damaged area without generating any substantial dust or grit.

In its preferred embodiment, the same basic mechanism can be used to both trim out the damaged area of a composite panel to a desired scarf angle without having access to a "blind side" of the panel, and for preparing a suitable repair plug for insertion into the trimmed out area from a sheet of composite repair material. Both the plug and the trimmed-out area have the corresponding desired scarf angle in the range of approximately 1°-5°.

The apparatus can comprise a frame member and a toggle mechanism which rotatably support a rope saw. The toggle mechanism is insertable through a bore which is initially drilled through the composite panel to be repaired. After insertion, the toggle mechanism is expanded and a tensioning mechanism is adjusted to draw the frame and the toggle device together so as to capture the composite panel. In a subsequent step, the rope saw is unfolded so as to make a plunge cut into the panel at the desired scarf angle. The tensioning member is then rotated so as to rotate the saw blade about an axis which is substantially perpendicular to the panel to be repaired. The tensioning device is then loosened so as to permit the toggle mechanism to fold up and be removed from the bore.

The toggle mechanism can also be removed from the tensioning device so that the apparatus can be used to prepare a suitable repair plug. To prepare the repair plug, a sheet of composite material, preferably having the same isotropic or anisotropic properties as the panel to be repaired, is positioned on top of a pedestal support. The frame member then supports the saw and tensioning mechanism above the supported repair sheet. The folding mechanism of the saw is then lowered until the saw blade makes a plunge cut into the repair material to the desired complementary depth and complementary scarf angle. The tensioning mechanism is then rotated through a full 360° to cut out a frustoconic repair plug having dimensions which correspond to that of the trimmed-out area of the panel to be repaired. The repair plug is then inserted into the trimmed-out area at the desired rotational orientation with respect to the panel, and bonded into place by methods which are well known to those of ordinary skill in the art.

The resulting repair is flush with the surrounding panel, does not significantly affect the isotropic or anisotropic properties of the panel, and does not generate a significant amount of dust or debris which might disadvantageously affect the bonding process or the surrounding environment.

BRIEF DESCRIPTION OF THE DRAWINGS

FIG. 1 is a partial, isometric view of a wing employing a composite panel having a damaged area.

FIG. 2 is a side elevational view of a cutting apparatus of the present invention.

FIG. 3 is a side elevational view, similar to FIG. 2, in which the cutting apparatus has been positioned through a bore in the panel to be repaired preparatory to a plunge cut.

FIG. 4 is a side elevational view, similar to FIGS. 2 and 3, illustrating a folding mechanism of the saw executing a plunge cut to a desired depth and scarf angle into the panel.

FIG. 5a is a sectional, elevational view of an upper bearing rotatably connecting a tension member to a frame member of the cutting apparatus.

FIG. 5b is a sectional, side elevational view of a bottom bearing rotatably connecting a toggle mechanism of the invention and the tension member.

DETAILED DESCRIPTION OF THE INVENTION

Figure 6:
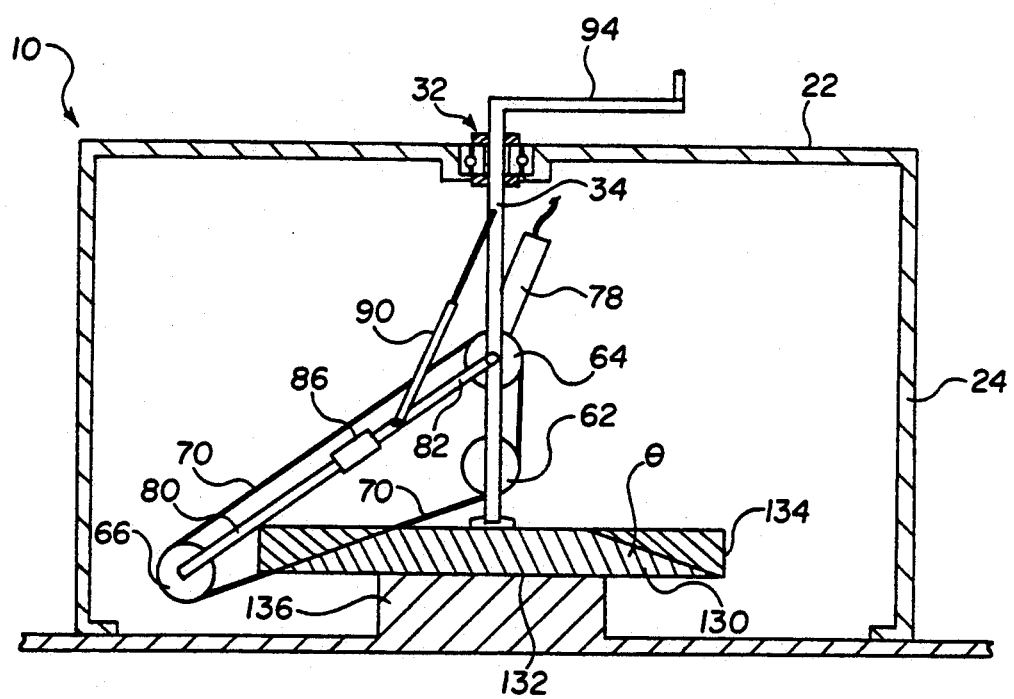
FIG. 6 is an adaptation of the invention shown in FIGS. 1-5 illustrating its use in preparing a frustoconical repair plug from a sheet of composite repair material for use in a trimmed area of the panel.

A rope saw cutting apparatus, in accordance with the principles of the invention, is generally indicated at reference numeral 10 in FIGS. 2-4 and 6. The apparatus is useful for preparing blind side repairs in composite panel structures such as the composite wing panel 12 shown in FIG. 1. The panel may be damaged, such as shown at damaged area 14. In any event, it is highly desirable to repair the damage area 14 with repair techniques which result in a flush surface, without substantially changing the isotropic or anisotropic loadbearing properties of the panel itself. As shown in FIG. 2, the damaged area is first cut away such as by a hole drill (not shown) so that a 2' bore 16 is formed in the composite panel 12. As will be described further hereinbelow, the rope saw cutting apparatus 10 is then partially inserted through this hole so that a tapered cut having a desired scarf angle in the range of 1°-5° can be formed in the panel.

The rope saw cutting apparatus 10 has a frame member comprising two orthogonal, horizontal beams 22 having four downwardly depending legs 24 which end in feet 26. The feet are adapted to rest against an upper surface 28 of the panel 12 at a distance of approximately 18" from an axis 30 defined by the bore 16. The legs 24 are approximately 18" long.

The frame member 20 rotatably supports, by an upper bearing mechanism generally indicated at reference numeral 32, an elongated rod 34. The rod is threaded along approximately ½ of its upper length for cooperative threaded engagement with a threaded collar 36. The rotation of the collar with respect to the rod 34 raises and lowers the rod to adjust the depth of the plunge cut as will be described further.

A toggle mechanism 40 is provided at a distal end 44 of the rod 34, and is rotatably connected thereto by a lower bearing assembly, generally indicated at reference numeral 50 in FIG. 5b. The toggle mechanism has two legs 52 which are connected pivotally in a radial plane with respect to the axis 30. The legs have a length of approximately 5". The toggle mechanism 44 and the frame member 20 cooperate with the elongated rod 34 and threaded collar 36 so as to capture the panel 12 therebetween.

A folding mechanism, generally indicated at reference numeral 60 in the drawings, is carried by the elongated rod 34 intermediate the expandable toggle mechanism 40 and the frame member 20. The saw has first, second, and third guide wheels 62, 64, and 66, respectively, which rotatably support a diamond-coated rope saw blade 70 for cutting a waste piece 72 from the panel 12. The guide wheels have a diameter of approximately 1". The first and second guide wheels are rotatably connected through the elongated rod 34 by first and second axles 74, 76. Axle 74 is journaled for rotation with the second guide wheel and with a conventional, high-speed pneumatic air motor 78 for driving the saw blade. A tension arm 82 consists of a distal section 80 and a proximal section 84 which are slidingly received in a collar 86. A compression spring 88 is positioned between the two sections to provide a bias force which tends to extend the distal end from the proximal end to maintain tension in the rope saw blade 70 throughout pivoting motion of the tension arm. The third guide wheel 66 is supported at the end of the distal section 80 of the pivoting tension arm 82. The proximal section 84 of the arm is pivotally connected to the second axle 76 so that it is pivotable with respect to the elongated rod 34.

As shown in FIGS. 3 and 4, an adjustable linkage 90 is pivotally connected between the elongated rod 34 and proximal section 84 of the tension arm 82 so as to permit movement of the arm from a position of approximately 30° with respect to the elongated rod, as shown in FIG. 3, to 90° with respect to the elongated rod, as shown in FIG. 4. This linkage permits control of the plunge. This pivoting motion advantageously permits saw blade 70 to perform a "plunge cut" into the panel 12 to a desired taper angle or "scarf angle" of generally between 1°-5°. Rotation of the elongated rod 34 through a full circle of revolution while the saw 60 is operating thereby removes the waste piece 72 from the panel 12.

To affix the apparatus 10 to the panel 12 and remove the waste piece as has been described above, reference is first made to FIG. 2 in which the saw 60 and toggle mechanism 44 are both in their respective folded positions. After the bore 16 has been formed about the damaged area 14, the apparatus is lowered onto the panel so that the feet 26 of the frame contact the upper surface 28 of the panel, and so that the legs 52 are fully inserted through the bore 16 beyond a blind side 92 of the panel. The legs 52 are then free to expand to their extended position as shown in FIGS. 3 and 4, whereupon rotation of the collar 36 in a clockwise fashion tends to drawn the frame and toggle mechanisms towards one another, thereby grasping the panel 12 therebetween. The apparatus 10 is therefore affixed to the panel. The linkage 90 is then adjusted to limit the downward pivoting motion of the tension arm 82 to a lower limit, as shown in FIG. 4 for example, to the desired scarf angle $\theta$. The motor 78 is then operated to rotate the saw blade 70, and a plunge cut is made as shown in FIG. 4 into the panel 12. Note that the axle 76 lies in a horizontal plane formed by the tips 93 of the legs 52 so that the blade 70 intersects the edge of the bore 16. With the motor still driving the saw blade 70, a handle 94 attached to the elongated rod 34 is rotated through a full revolution to cut out the plug 72, as shown in FIG. 4. The collar 36 is then loosened by rotation in a counterclockwise fashion with respect to the elongated rod 34 to release the toggle mechanism 52 from the blind side 92 of the panel so that the legs 52 can be folded up and withdrawn through the bore 16. The panel 12 is thus prepared with a tapered aperture having the desired scarf angle $\theta$.

To permit rotation of the elongated rod 34 with respect to the frame 20, the upper bearing mechanism 32 shown in FIG. 5a is provided with a conventional bearing 100 including balls 110, an inner race 112, and an outer race 114. The outer race is received in a cup 116 of the frame 20 to react against downward forces on the bearing 100 when the collar 36 is tightened. Nuts 118 journal the inner race of the bearing 100 with the rod 34 for rotation therewith.

To permit rotation of the rod 34 with respect to the toggle mechanism 44, the lower bearing assembly 50 is provided with a bearing 120 identical to the bearing 100 in the upper bearing assembly, except that here the toggle has a cup 122 inverted in orientation with respect to the cup 116 of the frame to resist upward movement of the toggle when the collar 36 of FIG. 5a is tightened. Nuts 124 identical to the nuts 118 in the upper bearing journal the rod 34 for rotation with the inner race of the bearing 120.

As shown in FIG. 6, the apparatus shown in FIGS. 2-3 can be used to prepare a suitable repair plug 130 having a complementary scarf angle $\phi$ for mating with the scarf angle $\theta$ in the trimmed area of the composite panel 12. The apparatus shown in FIG. 6 is identical to that shown in FIGS. 2-5 except that the toggle mechanism 44 has been removed by removing the nuts 124 of the lower bearing assembly 50 shown in FIG. 5b. An additional foot 132, such as a cup made from rubber, is used to seat the rod 34 on top of a square piece of composite repair stock 134. The repair stock 134 is positioned on top of a pedestal support 136 which has a radial dimension smaller than that of the desired repair plug 132. The repair stock is temporarily affixed to the pedestal 136 by a non-destructive bonding agent such as rubber cement. To cut out the repair plug 132 from the square piece of repair stock 134, the adjustable linkage 90 is adjusted to permit blade 70 to pivot to an angle greater than 90° with respect to the rod 34. After making a plunge cut to the desired scarf angle in a manner similar to that described hereinabove, the handle 94 is rotated through a full 360° to remove the unnecessary material in the repair stock.

The method for preparing a repair plug 130 advantageously permits the use of repair stock 134 having anisotropic load-bearing properties which complement and/or match the anisotropic load-bearing properties of the panel 12 which is to be repaired. By properly aligning the repair plug 130 with respect to the panel 12, the resulting, repaired panel has a flush outer surface 28 that contains the same anisotropic load-bearing properties, flexibility, etc., as the panel did before it was damaged. The repair plug 130 is bonded to the panel 12 by any number of conventional, composite structure bonding techniques. These bonding techniques are well known to those of ordinary skill in the art.

Other variations and modifications of the invention will become apparent to those of ordinary skill in the art upon reviewing the above disclosure. Therefore, the invention is not to be limited by this disclosure, but is to be determined in scope by the claims which follow.

We claim:

1. A cutting apparatus for trimming a damaged area of a composite structure panel for subsequent repair, comprising:
    a frame member for contacting a first side of the panel;
    a foldable reaction member for contacting a second side of the panel;
    a tension member rotatably connected between the frame and the reaction members for tightening the panel between the frame and reaction members; and
    a saw connected to the tension member, the saw having a blade and a folding mechanism for moving the blade between folded position for insertion of at least a portion of the saw along with a portion of the reaction member through an aperture in the panel and an unfolded position for performing a plunge cut into the panel, whereupon subsequent rotation of the tension member cuts out a plug from the panel.

2. The apparatus of claim 1 wherein the saw blade is a rope saw blade.

3. The apparatus of claim 2 wherein the folding mechanism includes a pivoting arm having two ends, one end being pivotally connected to the tension member and the other end rotatably supporting a guide wheel for the rope saw blade, wherein the arm also has a bias mechanism for maintaining tension on the saw substantially throughout the motion of the folding mechanism.

4. The apparatus of claim 3 wherein the bias mechanism has a spring loaded telescoping section on the pivoting arm.

5. The apparatus of claim 3 wherein the saw further includes two additional guide wheels for the rope saw blade, and wherein the additional guide wheels are rotatably connected to the tension member for rotation therewith.

6. The apparatus of claim 5, including depth adjustment means for limiting movement of the pivoting arm to control the depth of the plunge cut.

7. The apparatus of claim 6 wherein the depth adjustment means includes an adjustable linkage having one end pivotally connected to the tension member and an other end pivotally connected to the pivoting arm.

8. The apparatus of claim 1 wherein the folding mechanism includes depth adjustment means for limiting movement of the folding mechanism from the folded position to the unfolded position thereby limiting the depth of the plunge cut.

9. The apparatus of claim 1, including a tension adjustment device interconnected between the frame member and the tension member for firmly holding the panel between the frame and reaction members.

10. The apparatus of claim 9 wherein the tension member includes an elongated rod defining a rod axis and having a threaded portion on a first end thereof for engagement with a cooperatively threaded portion on the tension adjustment device, and wherein the foldable reaction member includes a plurality of extendable legs pivotally connected to a second end of the rod so as to be arcuately moveable over a limited distance in planes extending radially from the rod axis.

11. A rope saw cutting apparatus for trimming out a damaged area of a composite structure panel for subsequent repair, comprising:
   frame means for contacting an exposed side of the panel to be repaired;
   reaction means for contacting an opposite side of the panel;
   tension means rotatably connected between the frame and the reaction means for holding the panel between the frame and reaction means; and
   a collapsible saw having a rope saw blade, the saw having a folding mechanism for moving the blade between a folded position for insertion of at least a portion of the saw through an aperture in the panel and an unfolded position for performing a plunge cut into the panel, so that subsequent rotation of the tension means cuts out a plug from the panel.

12. The apparatus of claim 11 wherein the folding mechanism includes a pivoting arm having two ends, one end being pivotally connected to the tension means and the other end rotatably supporting a guide wheel for the rope saw blade, wherein the arm also has a bias mechanism for maintaining tension on the blade substantially throughout the motion of the folding mechanism.

13. The apparatus of claim 12 wherein the bias mechanism has a spring loaded telescoping section on the pivoting arm.

14. The apparatus of claim 13 wherein the collapsible saw further includes two additional guide wheels for the rope saw blade, and wherein the additional guide wheels are rotationally connected to the tension means for rotation therewith.

15. The apparatus of claim 14, including depth adjustment means for limiting movement of the pivoting arm to control the depth of the plunge cut.

16. The apparatus of claim 15 wherein the depth adjustment means includes an adjustable linkage having one end pivotally connected to the tension means and an other end pivotally connected to the pivoting arm.

17. The apparatus of claim 11 wherein the folding mechanism includes depth adjustment means for limiting movement of the folding mechanism from the folded position to the unfolded position thereby limiting the depth of the plunge cut.

18. The apparatus of claim 11, including a tension adjustment device interconnected to the frame means and the tension means for firmly holding the panel between the frame and reaction means.

19. A rope saw cutting apparatus for cutting a substantially frustoconic section from a first composite panel for use as a repair plug having a complementary scarf angle for mating with a scarf angle in a trimmed area of a second composite panel, the apparatus comprising:
   a frame member;
   a saw support member rotatably connected to the frame member for supporting a rope saw and for rotating the supported rope saw up to 360° about the support member's longitudinal axis; and
   a saw having a rope saw blade pivotally connected to the saw support member, the saw having a folding mechanism for moving the blade between a folded position preparatory to making a plunge cut in the first panel to a desired depth and angle and an unfolded position for performing the plunge cut and for performing a substantially frustoconic cut, the unfolded position orienting the blade at an angle relative to the first panel corresponding to the complementary scarf angle whereupon subsequent rotation of the saw support member about its axis up to 360° causes the saw to cut the section.

20. The apparatus of claim 19 wherein the folding mechanism includes a pivoting arm having two ends, one end being pivotally connected to the saw support member and the other end remote from the frame and rotatably supporting a guide wheel for the rope saw blade, wherein the arm also has a bias mechanism for maintaining tension on the blade substantially throughout the motion of the folding mechanism.

21. The apparatus of claim 20 wherein the bias mechanism has a spring loaded telescoping section on the pivoting arm.

22. The apparatus of claim 21 wherein the saw further includes two additional guide wheels for the rope saw blade, and wherein the additional guide wheels are rotationally connected to the saw support member for rotation therewith.

23. The apparatus of claim 22, including depth adjustment means for limiting movement of the pivoting arm to control the depth of the plunge cut.

24. The apparatus of claim 23 wherein the depth adjustment means includes an adjustable linkage having one end pivotally connected to the saw support member and an other end pivotally connected to the pivoting arm.

25. A method for scarfing a damaged area of a substantially closed surface in a composite structure panel for subsequent repair, comprising the steps of:
   forming an aperture in the panel around the damaged area and to define a rotation axis;
   positioning a frame member of a cutting apparatus against an exposed side of the panel;
   passing a fodable reaction member of the apparatus in a substantially folded condition through the aperture;
   unfolding the reaction member so that portions of the reaction member extend radially beyond the aperture;
   drawing the frame member and reaction member towards one another so as to hold the panel therebetween;
   pivoting a cutting apparatus into the panel, thereby making a plunge cut to a desired depth and at a desired scarf angle; and
   rotating the cutting apparatus about the rotation axis, thereby cutting a plug from the panel.

26. The method of claim 25 wherein during the pivoting step the plunge cut is made to the desired depth so that the desired scarf angle is in the range of one to five degrees.

* * * * *

UNITED STATES PATENT AND TRADEMARK OFFICE
CERTIFICATE OF CORRECTION

PATENT NO. : 5,271,145
DATED : December 21, 1993
INVENTOR(S) : Everett A. Westerman and Philip E. Roll It is certified that error appears in the above-indentified patent and that said Letters Patent is hereby corrected as shown below:

In column 6, claim 1, line 26, after "between" and before "folded", please insert --a--.

In column 8, claim 25, line 47, please delete "fodable" and substitute therefor --foldable--.

Signed and Sealed this

Twelfth Day of July, 1994

*Attest:*

BRUCE LEHMAN

*Attesting Officer*  *Commissioner of Patents and Trademarks*